UNITED STATES PATENT OFFICE.

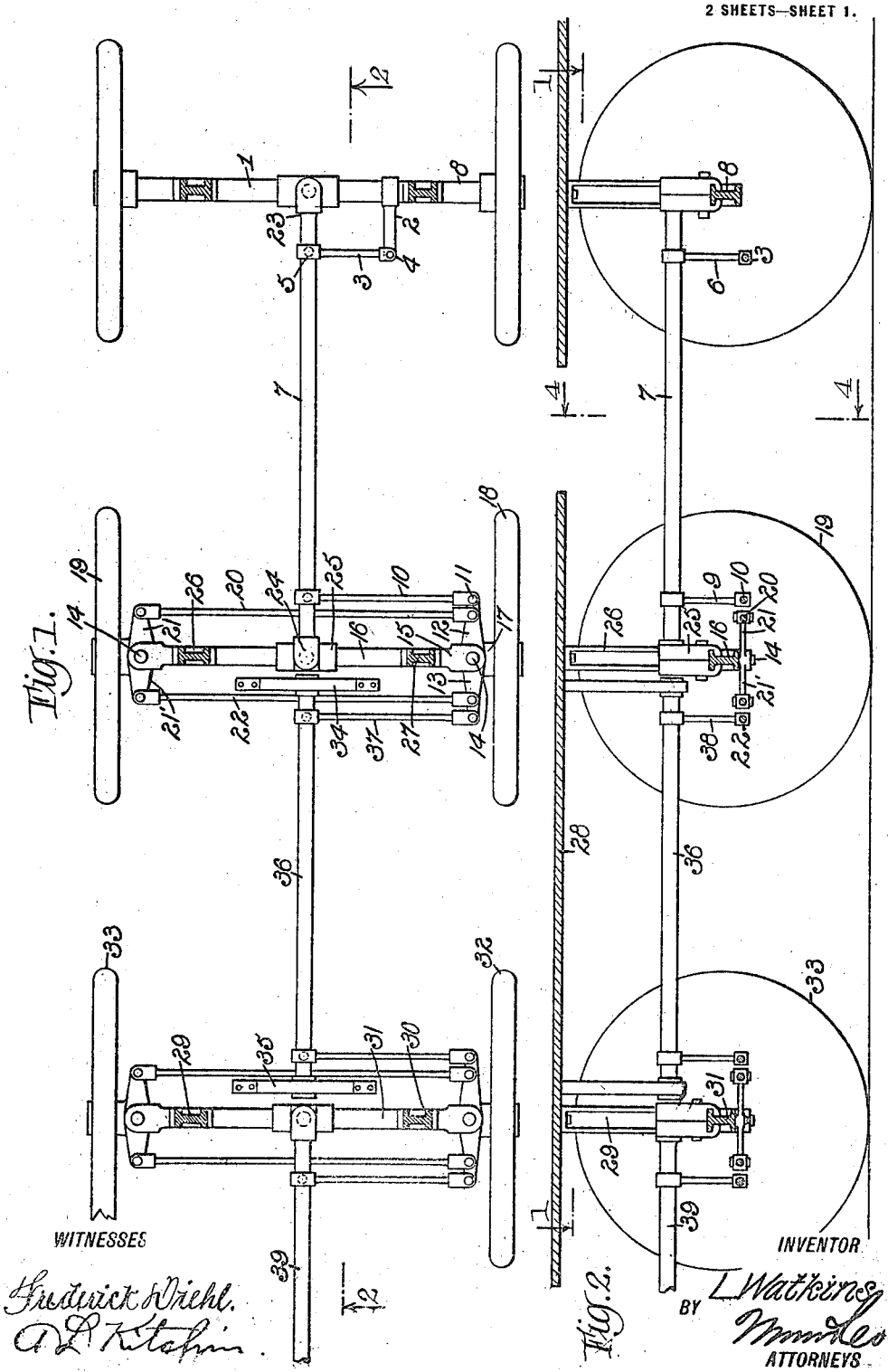

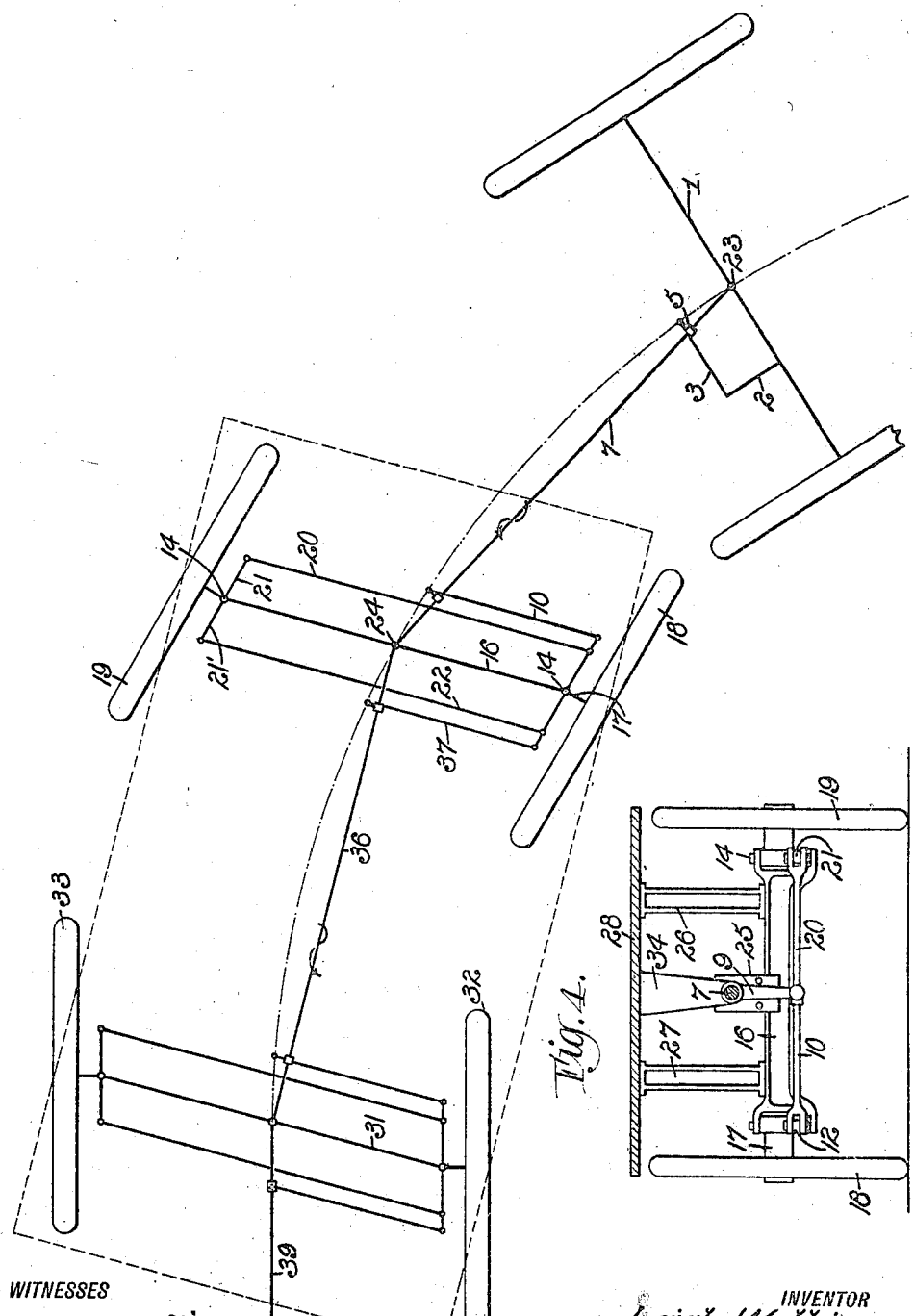

LEIGH WATKINS, OF SAN ANTONIO, TEXAS.

TRAILER.

1,238,603. Specification of Letters Patent. Patented Aug. 28, 1917.

Application filed October 21, 1916. Serial No. 126,909.

*To all whom it may concern:*

Be it known that I, LEIGH WATKINS, a citizen of the United States, and a resident of San Antonio, in the county of Bexar and State of Texas, have invented a new and Improved Trailer, of which the following is a full, clear, and exact description.

This invention relates to an improved construction and arrangement of trailers and has for an object the provision of means which will allow an easy turning movement where a number of trailers are connected while admitting of strain between the various trailers, whereby they are propelled properly around a curve.

Another object in view is to provide a trailer structure in which rocked shafts are utilized, together with suitable connecting means for giving a proper angle to various wheels in order that a proper turning movement may be produced and at the same time the succeeding trailers may properly pass around a given curve.

A still further object in view is to provide an improved construction by which the wheels may be connected in such a manner that the wheels of successive wagons, or trailers, connected together would follow in the same track either in a straight line or when moving around a bend.

In the accompanying drawings,

Figure 1 is a sectional view through Fig. 2 on line 1—1.

Fig. 2 is a longitudinal vertical section through the structure shown in Fig. 1, the same being taken on line 2—2.

Fig. 3 is a diagram of the trailers showing the position of the parts when passing around a curve.

Fig. 4 is a section through Fig. 2 on line 4—4.

Referring to the accompanying drawings by numerals 1 indicates a power unit, which may be an ordinary motor truck, same being provided with a bracket 2 to which a link 3 is pivotally connected at 4, said link in turn being pivotally connected at 5 to a depending arm 6, which depending arm is formed integral with or rigidly secured to the rocking shaft 7. By this structure and arrangement whenever the axle 8 is turned, as shown in the diagram Fig. 3, link 3 will be moved longitudinally and consequently swing the arm 6 and rotate to a certain extent the rock shaft 7 which movement will cause the arm 9 to be swung to one side and consequently pull the link 10, which link is pivotally connected at 11 to the lever 12. The lever 12 is preferably integral with lever 13 and has a vertical pivotal pin 14 rigidly secured thereto, which pivotal pin extends through the bifurcated end 15 of the axle 16. A stub shaft 17 is rigidly secured to or formed integral with pin 14 and carries the wheel 18 whereby said wheel will be moved to one side, or at an angle, as shown in Fig. 3, when the pin 14 is partially rotated.

A wheel 19 and associated parts are constructed similar to wheel 18 and associated parts, so that no additional description will be necessary therefor, except that power is communicated from lever 12 through the connecting rod 20 to the levers 21 and 21'. A second connecting rod 22 is provided that connects lever 13 with lever 21' for assisting in making more uniform the strain on the pins 14 and associated parts. In this way whenever the axle 8 of the tractor is moved to one side, as for instance, as shown in Fig. 3, power will be communicated to the wheels 18 and 19 for turning these wheels so that they will follow in the track of the wheels on axle 8.

A shaft 7 is pivotally mounted at 23 on the tractor 1 and pivotally mounted at 24 on a suitable bracket 25 secured to the axle 16. Axle 16 is provided with supporting standards 26 and 27 so as to support the front part of the platform 28, which platform has the rear part supported by standards 29 and 30, said standards being mounted on the axle 31. Said axle 31 carries wheels 32 and 33 and other mechanism identical with that carried by axle 16, so that no additional description is thought necessary. However, it will be noted that suspended brackets 34 and 35 are provided which brackets are secured to platform 28, said brackets having the rock shaft 36 pivotally mounted thereon in order to properly transmit motion from lever 13 to a similar lever on axle 31, the motion being transmitted from lever 13 through link 37 to the depending arm 38 which is rigidly secured to the rock shaft 36.

It will be observed that the rock shaft 39 extends from axle 31 whereby the next succeeding set of wheels may be operated so that they will follow the track of the preceding wheels, as shown in diagram 3. In this way the position of the various sets of wheels automatically changed in order to cause the proper turning of a corner, the proper following of the succeeding wheels and the communicating of the tractor force.

When the tractor 1 turns to one side the change of the position of axle 8 will cause the rock shaft 7 to rock to one side as shown in Fig. 3. This will communicate movement to all of the wheels of the trailer in order to cause the wheels of the trailer to assume the position shown in Fig. 3 when passing around a curve.

What I claim is:

1. In a device of the character described, a tractor and a trailer therefor, said trailer being formed with means for shifting the position of the wheels thereof, whereby said wheels will follow the path of the rear wheels of the tractor, said means comprising levers for turning said wheels, links for connecting the levers of the same axle, a rock shaft arranged between the front axle of said trailer and the rear axle of said tractor, a depending arm on each end of said rock shaft, a link for connecting one depending arm of the rock shaft to one of the levers on the trailer, and a link for connecting the other of the depending arms of the rock shaft with the rear axle of the tractor, whereby whenever said rear axle is turned for passing around a corner motion will be transmitted to said rock shaft rocking same in a certain direction and from thence to the wheels of the trailer.

2. In a device of the character described, a tractor and a trailer therefor, said trailer being formed with means for shifting the position of the wheels thereof whereby said wheels will follow the path of the rear wheels of the tractor, said means comprising levers for turning said wheels, links for connecting the levers of the same axle, a rock shaft arranged between the axles of said trailer, a depending arm arranged on each end of said rock shaft, a link for each arm connecting the arms to one of the levers on each axle of the trailer, whereby when the front wheels turn in one direction the rear wheels will turn in the opposite direction, a rock shaft arranged between the front axle of said trailer and the rear axle of said tractor, a depending arm on each end of said last mentioned rock shaft, a link for connecting one of said last mentioned depending arms to one of the levers on the trailer, and a link for connecting the other of said last mentioned depending arms with the rear axle of the tractor, whereby whenever said rear axle is turned in passing around a corner motion will be transmitted to both of said rock shafts and from thence to the wheels of the trailer for causing the same to follow the rear wheels of the tractor.

LEIGH WATKINS.

Witnesses:
H. W. BLUM,
W. K. BAIRD.